A. HARVEY.
SAFETY THRUST BEARING FOR GRINDING MACHINES.
APPLICATION FILED FEB. 9, 1912.
1,049,710.
Patented Jan. 7, 1913.
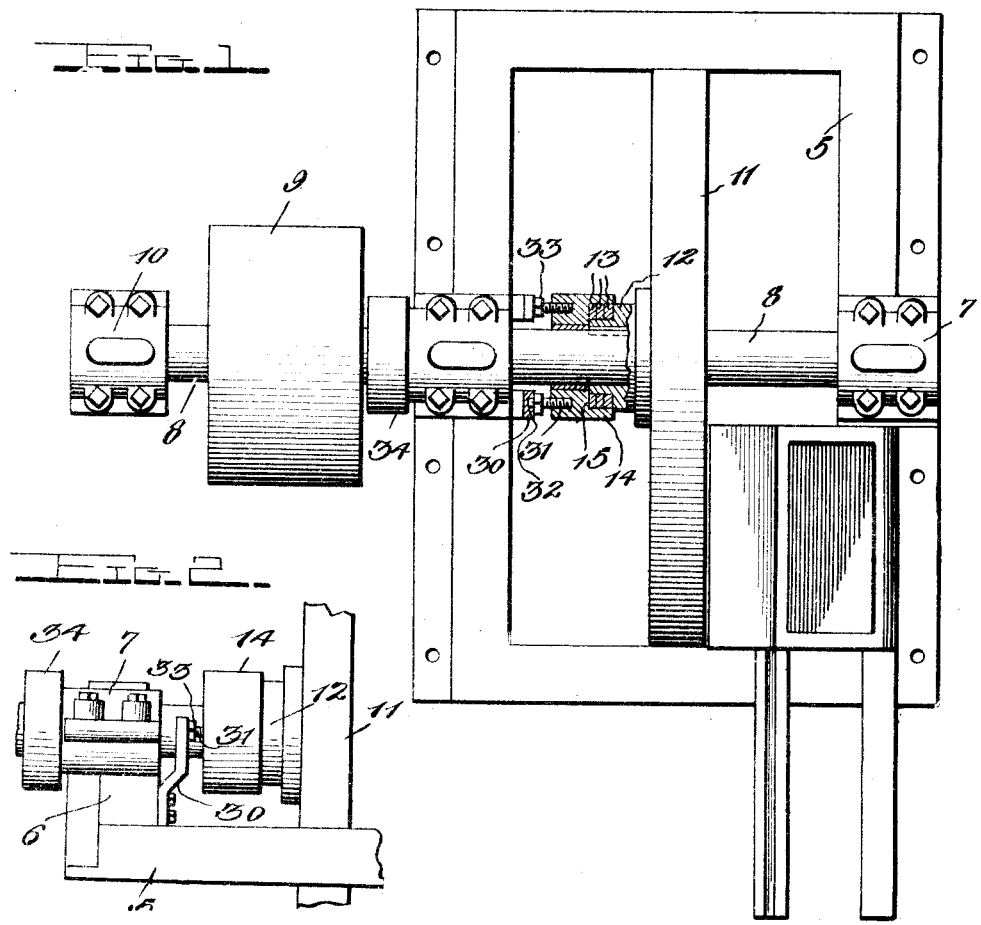
Witnesses
Chas. L. Grieebauer.
A. B. Norton.
Inventor
A. Harvey,
By Watson E. Coleman,
Attorney

UNITED STATES PATENT OFFICE.

AMASA HARVEY, OF GEORGETOWN, SOUTH CAROLINA.

SAFETY THRUST-BEARING FOR GRINDING-MACHINES.

1,049,710.  Specification of Letters Patent.  Patented Jan. 7, 1913.

Application filed February 9, 1912. Serial No. 676,530.

*To all whom it may concern:*

Be it known that I, AMASA HARVEY, a citizen of the United States, residing at Georgetown, in the county of Georgetown and State of South Carolina, have invented certain new and useful Improvements in Safety Thrust-Bearings for Grinding-Machines, of which the following is a specification, reference being had to the accompanying drawings.

This invention has relation to a hog or refuse grinder and has for its primary object to provide a machine for this purpose wherein a rotary cutting wheel or disk is provided in which one or more series of cutting knives are mounted, and means for preventing breakage of the knives or other parts of the mechanism when the knives encounter metallic objects or other relatively hard resisting foreign materials in the refuse being ground or masticated.

Still another object of the invention resides in the provision of a machine of the above character embodying features of simplicity, durability and efficiency and which may be manufactured at comparatively small cost.

With the above and other objects in view, the invention consists of the novel features of construction, combination and arrangement of parts hereinafter fully described and claimed, and illustrated in the accompanying drawings, in which—

Figure 1 is a plan view partly in section illustrating the present invention; and Fig. 2 is a fragmentary side elevation of a machine provided with my invention.

Referring in detail to the drawings 5 designates a frame of substantially rectangular form in plan which is preferably constructed of angle iron. The parallel longitudinal portions of the spaced frame are centrally provided with the vertical bearing standards 6 upon the upper ends of which the lower half or base portions of the bearings 7 are formed. In these bearings the shaft 8 is mounted, said shaft extending beyond one of the bearings and having a band wheel or pulley 9 keyed or otherwise fixed thereon. The extreme end of the shaft 8 is supported in a suitable bearing 10.

A cutting wheel or disk 11 is rigidly keyed upon the shaft 8 between the longitudinal bars of the base frame 5, said wheel being provided with a hub or extension 12, one end of which carries the friction washers 13 and is disposed in an annular recess 15 provided in one face of a thrust collar 14 which is loosely mounted upon the shaft 8. The disk or wheel 11 is provided with the usual grinding or cutting knives, (not shown), which may be mounted in said disk in any approved manner.

In order to obviate liability of serious injury to the cutting knives carried by the disk or breakage of other parts of the machine, I provide the vertically disposed lugs 30 which are secured to one of the bearing standards 6 at their lower ends, said lugs being arranged on opposite sides of the shaft 8 and having their upper ends disposed adjacent thereto. Adjusting screws 31 are threaded in one end of the thrust collar 14 at diametrically opposite points and have their other ends seated in sockets or recesses 32 which are formed in the upper ends of the lugs 30. Adjacent to the latter ends of the adjusting screws, rectangular shoulders or enlargements 33 are formed thereon which engage with the lugs 30. By adjusting the screws 31, the thrust collar 14 may be moved toward or from the disk or wheel 11 so that the knives carried by the disk may be properly disposed with relation to the bed knife and adjusted toward or from the same. As the upper free end portions of the lugs 30 are comparatively weak, it will be obvious that when a piece of metal or other foreign material is fed to the machine with the refuse material, the engagement of the knives on the disk with this comparatively hard resisting object will cause the disk and shaft to move longitudinally, thus forcing the collar 14 toward the lug 30, and thereby bending or breaking said lugs. In this manner liability of serious damage to the machine elements is practically eliminated.

A suitable set collar 34 is secured upon the shaft 8 against the end of one of the bearings 7 for said shaft to prevent longitudinal movement of the shaft in its bearings and thereby maintain the knife carrying disk at all times in its adjusted position on said shaft.

From the foregoing it is believed that the construction and operation of my improved hog or refuse grinder will be fully understood.

My improved construction provides a machine of this character having a maximum of durability and working efficiency, while at the same time the machine consists of a comparatively small number of elements.

Having thus described the invention what is claimed is:—

1. In a machine of the character described, a rotary shaft, a disk keyed for longitudinal movement upon the shaft, a thrust collar loosely mounted upon the shaft between one face of the disk and one of the shaft bearings, breakable lugs arranged upon opposite sides of the shaft, and screws threaded in the thrust collar and having shoulders bearing against said lugs, the adjustment of said screws in the collar positively moving said collar and the disk longitudinally upon the shaft, the shoulders upon said screws being adapted to force the lugs from their normal positions and break the same upon abnormal pressure against one side of the disk in an axial direction and toward the lugs.

2. In a machine of the character described, a rotary shaft, a disk keyed for longitudinal movement upon the shaft, a thrust collar loosely mounted upon the shaft between one face of the disk and one of the shaft bearings, breakable lugs arranged upon opposite sides of the shaft, said lugs being provided with recesses, and screws threaded in the thrust collar and seated in the recesses of said lugs to prevent rotation of the collar with said shaft, said screws being provided with shoulders to bear against the lugs and break the same upon abnormal pressure against one side of the disk in an axial direction and toward the lugs.

In testimony whereof I hereunto affix my signature in the presence of two witnesses.

AMASA HARVEY.

Witnesses:
M. C. LYDDANE,
GEO. S. LIVINGSTON.